(12) United States Patent
Hull et al.

(10) Patent No.: US 11,710,877 B2
(45) Date of Patent: Jul. 25, 2023

(54) MODULAR BATTERY SYSTEMS FOR AIRCRAFT

(71) Applicant: Textron Innovations Inc., Providence, RI (US)

(72) Inventors: Michael Raymond Hull, Fort Worth, TX (US); Steven Loveland, Keller, TX (US); Yue Fan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 256 days.

(21) Appl. No.: 17/327,753

(22) Filed: May 23, 2021

(65) Prior Publication Data

US 2022/0376363 A1 Nov. 24, 2022

(51) Int. Cl.
*H02P 1/00* (2006.01)
*H01M 50/512* (2021.01)
*B64D 27/24* (2006.01)
*B60L 50/64* (2019.01)
*B64C 29/00* (2006.01)
*B60L 58/10* (2019.01)
*H01M 10/42* (2006.01)
(Continued)

(52) U.S. Cl.
CPC .......... *H01M 50/512* (2021.01); *B60L 50/64* (2019.02); *B60L 58/10* (2019.02); *B64C 29/00* (2013.01); *B64D 27/24* (2013.01); *H01M 10/425* (2013.01); *H01M 10/4207* (2013.01); *H01M 50/209* (2021.01); *H01M 50/249* (2021.01); *B60L 2200/10* (2013.01); *B64D 2221/00* (2013.01); *H01M 2010/4271* (2013.01); *H01M 2220/20* (2013.01)

(58) Field of Classification Search
CPC .... H01M 50/512; H01M 50/64; H01M 58/10; H01M 50/249; H01M 50/209; H01M 2200/10; H01M 10/4207; H01M 10/425; H01M 2010/4271; H01M 2220/20; B64C 29/00; B64D 27/24; B64D 2221/00; H02P 25/02
See application file for complete search history.

(56) References Cited

U.S. PATENT DOCUMENTS

2022/0267017 A1 * 8/2022 Pitre ...................... B60L 58/26

FOREIGN PATENT DOCUMENTS

| CA | 3063446 A1 * | 12/2018 | ........ H01M 10/4207 |
| WO | WO-2019025577 A1 * | 2/2019 | ........ H01M 10/4207 |

* cited by examiner

*Primary Examiner* — Karen Masih
(74) *Attorney, Agent, or Firm* — Lawrence Youst PLLC (57) ABSTRACT

A modular battery system provides propulsive power to the rotor system of an aircraft. The modular battery system includes an array of battery modules arranged in at least one stack. Each battery module includes a plurality of battery cells, a first side having positive and negative receptacles and a second side, that is opposite of the first side, having positive and negative plugs. The receptacles and plugs are configured such that adjacent battery modules in a side-by-side relationship are electrically coupled together via plug and receptacle connections and such that the battery modules are electrically coupled together in parallel. An interconnection electrically couples each stack of battery modules together via plug and receptacle connections with one of the battery modules in each stack such that the stacks of battery modules are electrically coupled together in parallel.

19 Claims, 9 Drawing Sheets

(51) Int. Cl.
*H01M 50/249* (2021.01)
*H01M 50/209* (2021.01)

MODULAR BATTERY SYSTEMS FOR AIRCRAFT

TECHNICAL FIELD OF THE DISCLOSURE

The present disclosure relates, in general, to battery systems configured to provide electrical power for the propulsion of aircraft and, in particular, to modular battery systems that include a plurality of battery modules that are electrically interconnected in side-by-side relationships that provide electrical power for the propulsion of aircraft.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that, in forward flight, produces low pressure on the upper surface and high pressure on the lower surface to generate the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and limitations of advancing blade Mach number.

Tiltrotor aircraft, which are another example of VTOL aircraft, attempt to overcome these drawbacks by utilizing proprotors that can change their plane of rotation based on the operation being performed. Tiltrotor aircraft typically have two or more proprotors mounted near the outboard ends of a fixed wing. The proprotors are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Electric vertical takeoff and landing (eVTOL) aircraft as well as electric fixed-wing aircraft utilize electricity to power the various systems of the aircraft including the propulsion systems. For example, a battery system may be used to power one or more rotor assemblies of a helicopter or a fixed-wing aircraft, two or more rotor assemblies of a tiltrotor or a tiltwing aircraft, four rotor assemblies of a quadcopter aircraft or any number of rotor assemblies of a multicopter aircraft. It has been found, however, that due to limitation in the energy density of battery cells, battery systems used to power the propulsion systems of aircraft may limit the aircraft's payload capacity and/or the aircraft's range. Accordingly, a need has arisen for improved battery systems that are used to power the propulsion systems of aircraft that minimize the weight penalty associated with the battery cells.

SUMMARY

In a first aspect, the present disclosure is directed to a modular battery system for providing propulsive power to a rotor system of an aircraft. The modular battery system includes an array of battery modules arranged in at least one stack. Each battery module includes a plurality of battery cells, a first side having positive and negative receptacles and a second side, that is opposite of the first side, having positive and negative plugs. The receptacles and plugs are configured such that adjacent battery modules having a side-by-side relationship are electrically coupled together via a positive plug and receptacle connection and a negative plug and receptacle connection and such that the battery modules are electrically coupled together in parallel. An interconnection electrically couples each of the stacks of battery modules together. The interconnection forms a positive plug and receptacle connection and a negative plug and receptacle connection with one of the battery modules in each stack such that the stacks of battery modules are electrically coupled together in parallel.

In some embodiments, each of the battery modules may include a battery management system configured to provide protections for the battery cells. In certain embodiments, each of the battery modules may include a vent configured to release gas produced by the battery cells. In some embodiments, each of the battery modules may include a voltage regulator configured to convert voltage between a battery cell voltage and a bus voltage. In such embodiments, the voltage regulator may be a DC-to-DC converter. In certain embodiments, each of the battery modules may include a positive bus bar and a negative bus bar that are coupled to the battery cells. In such embodiments, the positive bus bar may be operably associated with the positive receptacle and the positive plug and the negative bus bar may be operably associated with the negative receptacle and the negative plug. In some embodiments, each of the battery modules may include a thermal conditioning system configured to thermally isolate the battery module from the other battery modules.

In certain embodiments, a first plurality of battery modules in the array of battery modules may include battery cells of a first type and a second plurality of battery modules in the array of battery modules may include battery cells of a second type that are different from the first type. In one example, the battery cells of the first type may be power cells while the battery cells of the second type may be energy cells. In another example, the battery cells of the first type may have a voltage in a fully charged state that is different than the voltage in a fully charged state of the battery cells of the second type. In a further example, the battery cells of the first type may have a maximum discharge rate that is different than the maximum discharge rate of the battery cells of the second type. In yet another example, the battery cells of the first type may have a chemistry that is different than the chemistry of the battery cells of the second type. In some embodiments, the plug and receptacle connections may be push-pull connections such as blind mate connections including locking blind mate connections.

In a second aspect, the present disclosure is directed to an electrical system configured to provide propulsive power to a rotor system of an aircraft. The electrical system includes at least one electric motor configured to drive the rotor system, a modular battery system and a distribution system that electrically couples the modular battery system to the at least one electric motor. The modular battery system includes an array of battery modules arranged in at least one stack. Each battery module includes a plurality of battery cells, a first side having positive and negative receptacles and a second side, that is opposite of the first side, having positive and negative plugs. The receptacles and plugs are configured such that adjacent battery modules having a side-by-side relationship are electrically coupled together via a positive plug and receptacle connection and a negative plug and receptacle connection and such that the battery modules are electrically coupled together in parallel. An interconnection electrically couples each of the stacks of battery modules together. The interconnection forms a positive plug and receptacle connection and a negative plug and receptacle connection with one of the battery modules in each stack such that the stacks of battery modules are electrically coupled together in parallel.

In a third aspect, the present disclosure is directed to an aircraft that includes a rotor system having at least one electric motor, a modular battery system and a distribution system that electrically couples the modular battery system to the at least one electric motor. The modular battery system includes an array of battery modules arranged in at least one stack. Each battery module includes a plurality of battery cells, a first side having positive and negative receptacles and a second side, that is opposite of the first side, having positive and negative plugs. The receptacles and plugs are configured such that adjacent battery modules having a side-by-side relationship are electrically coupled together via a positive plug and receptacle connection and a negative plug and receptacle connection and such that the battery modules are electrically coupled together in parallel. An interconnection electrically couples each of the stacks of battery modules together. The interconnection forms a positive plug and receptacle connection and a negative plug and receptacle connection with one of the battery modules in each stack such that the stacks of battery modules are electrically coupled together in parallel.

In some embodiments, the rotor system may include a plurality of rotor assemblies. In certain embodiments, the aircraft may be an eVTOL aircraft such as an air taxi configured for autonomous flight.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
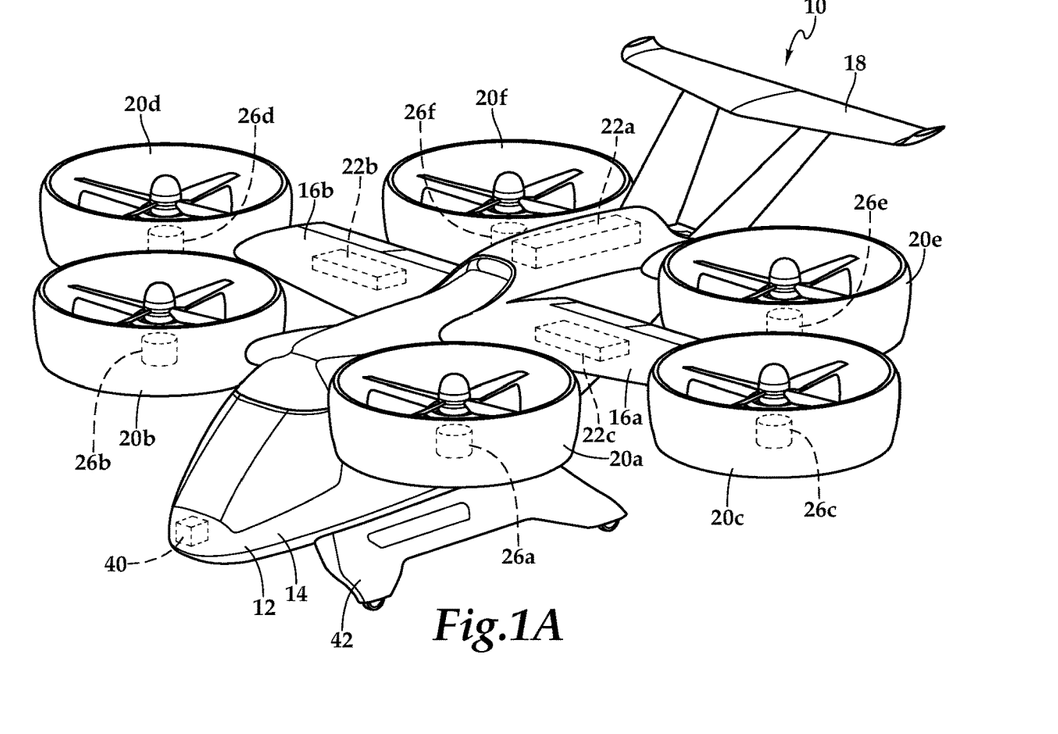
FIGS. 1A-1F are schematic illustrations of an eVTOL aircraft having a modular battery system in accordance with embodiments of the present disclosure.
Figure 1B:
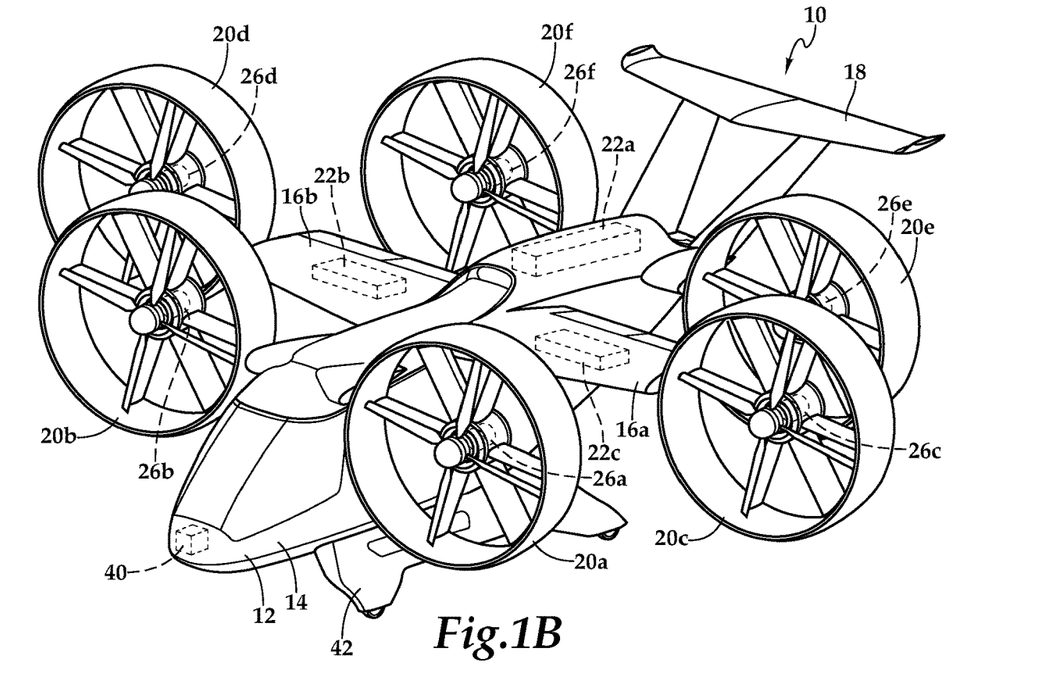
Figure 1C:
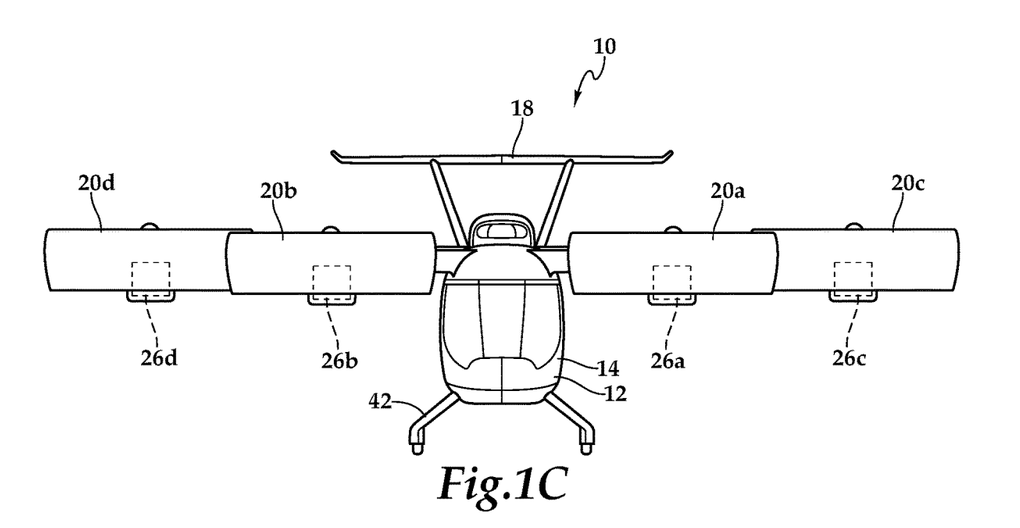
Figure 1D:
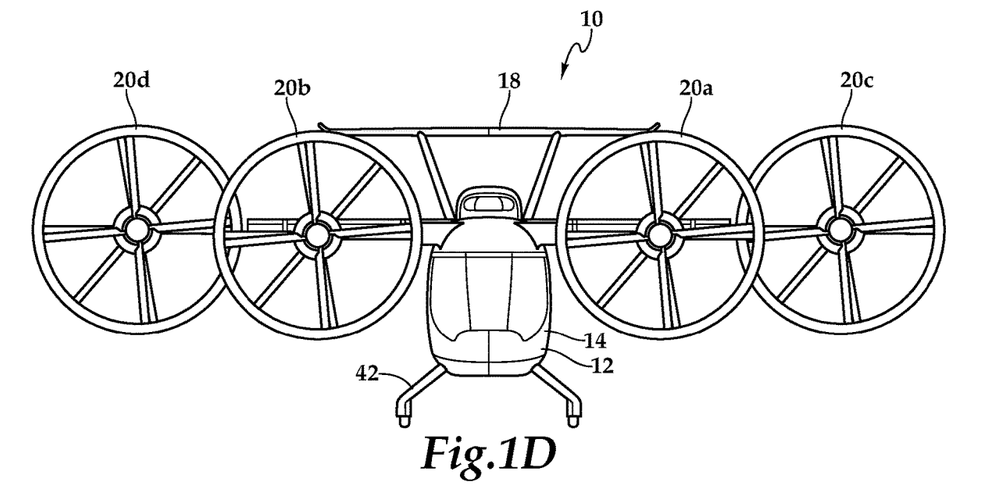
Figure 1E:
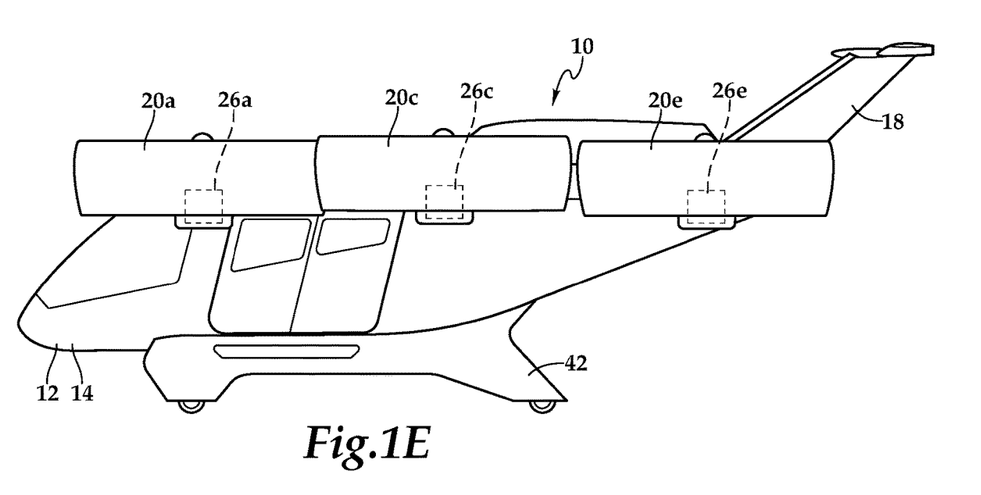
Figure 1F:
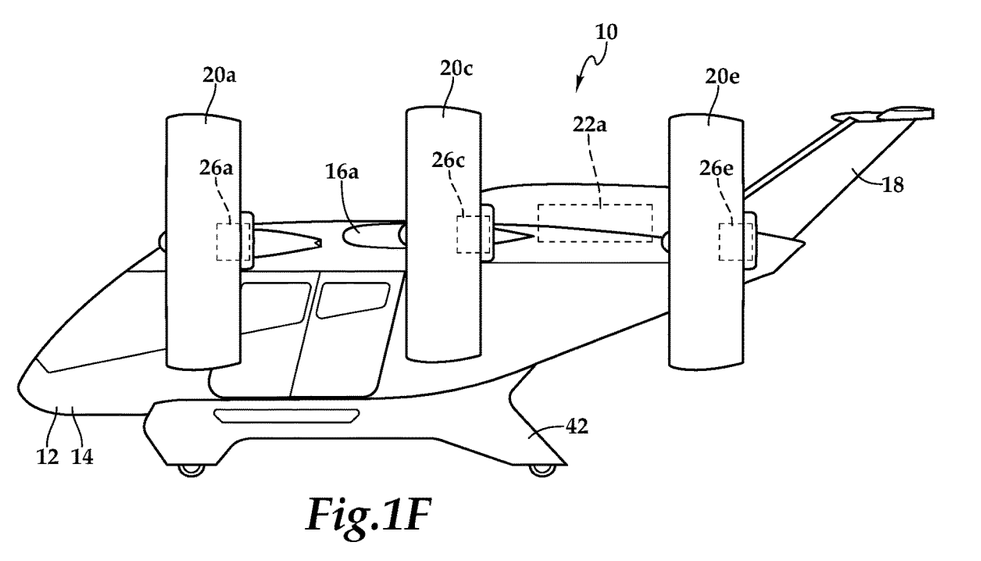

Referring to FIGS. 1A-1F in the drawings, an aircraft, depicted as an electric vertical takeoff and landing (eVTOL) aircraft, having a modular battery system in accordance with embodiments of the present disclosure is schematically illustrated and generally designated 10. As illustrated, aircraft 10 is an air taxi that may be pilot operated, remotely operated or may operate autonomously to provide air taxi services. FIGS. 1A, 1C, 1E depict aircraft 10 in a VTOL orientation wherein the rotor system provides thrust-borne lift. FIGS. 1B, 1D, 1F depict aircraft 10 in a forward flight orientation wherein the rotor system provides forward thrust with the forward airspeed of aircraft 10 providing wing-borne lift enabling aircraft 10 to have a high speed and/or high endurance forward flight mode. In the illustrated embodiment, aircraft 10 has an airframe 12 including a fuselage 14, wings 16a, 16b and a tail assembly 18. Each of wings 16a, 16b has an airfoil cross-section that generates lift responsive to the forward airspeed of aircraft 10. In the illustrated embodiment, wings 16a, 16b are straight wings with a tapered leading edge. It will be appreciated, however, that wings 16a, 16b may be of a wide variety of shapes, sizes and configurations, depending upon the performance characteristics desired. In the illustrated embodiment, wings 16a, 16b include ailerons to aid in roll and/or pitch control of aircraft 10 during forward flight. Tail assembly 18 is depicted as having a pair of vertical stabilizers that may include one or more rudders to aid in yaw control of aircraft 10 during forward flight. In addition, tail assembly 18 has a horizontal stabilizer that may include one or more elevators to aid in pitch control of aircraft 10 during forward flight. It will be appreciated, however, that tail assembly 18 may be of a wide variety of shapes, sizes and configurations, depending upon the performance characteristics desired.

In the illustrated embodiment, the rotor system of aircraft 10 is depicted as six rotor assemblies. In other embodiments, the rotor system of an aircraft having a modular battery system of the present disclosure could have other numbers of rotor assemblies both greater than or less than six. For example, a helicopter or a fixed-wing aircraft having a modular battery system of the present disclosure could have a rotor system with one or more rotor assemblies, a tiltrotor aircraft or tiltwing aircraft having a modular battery system of the present disclosure could have a rotor system with two or more rotor assemblies, a quadcopter having a modular battery system of the present disclosure could have a rotor system with four rotor assemblies or a multicopter having a modular battery system of the present disclosure could have a rotor system with any number of rotor assemblies. In the illustrated embodiment, the rotor system of aircraft 10 includes a forward-port rotor assembly 20a, a forward-starboard rotor assembly 20b, a mid-port rotor assembly 20c, a mid-starboard rotor assembly 20d, an aft-port rotor assembly 20e and an aft-starboard rotor assembly 20f, which may be referred to collectively as rotor assemblies 20. Forward-port rotor assembly 20a and forward-starboard rotor assembly 20b are each rotatably mounted to a shoulder portion of fuselage 12 at a forward station thereof. Mid-port rotor assembly 20c is rotatably mounted on the outboard end of wing 16a. Mid-starboard rotor assembly 20d is rotatably mounted on the outboard end of wing 16b. Aft-port rotor assembly 20e and aft-starboard rotor assembly 20f are each rotatably mounted to a shoulder portion of fuselage 12 at an aft station thereof.

In the illustrated embodiment, rotor assemblies 20 are ducted rotor assemblies each having a four bladed rotor with variable pitch rotor blades operable for collective pitch control. In other embodiments, the rotor assemblies could be non-ducted or open rotor assemblies, the number of rotor blades could be either greater than or less than four and/or the rotor blades could have a fixed pitch. Rotor assembly 20a includes at least one variable speed electric motor 26a, rotor assembly 20b includes at least one variable speed electric motor 26b, rotor assembly 20c includes at least one variable speed electric motor 26c, rotor assembly 20d includes at least one variable speed electric motor 26d, rotor assembly 20e includes at least one variable speed electric motor 26e and rotor assembly 20f includes at least one variable speed electric motor 26f. The electric motors 26a-26f associated with rotor assemblies 20 may be collectively referred to as electric motors 26. Each of electric motors 26 may have a speed controller or other modulating device operably associated therewith that is configured to provide variable speed control over a wide range of rotor speeds.

When aircraft 10 is operating in the VTOL orientation and supported by thrust-borne lift, rotor assemblies 20 each have a generally horizontal orientation such that the rotors are rotating in generally in the same horizontal plane, as best seen in FIGS. 1C, 1E. When aircraft 10 is operating in the forward flight orientation and supported by wing-borne lift, rotor assemblies 20 each have a generally vertical orientation with the forward rotors rotating generally in a forward-vertical plane, the mid rotors rotating generally in a mid-vertical plane and the aft rotors rotating generally in an aft-vertical plane, as best seen in FIG. 1F. Transitions between the VTOL orientation and the forward flight orientation of aircraft 10 are achieved by changing the angular positions of rotor assemblies 20 between their generally horizontal orientations and their generally vertical orientations as discussed herein.

Aircraft 10 includes one or more modular battery systems depicted as modular battery subsystem 22a disposed in fuselage 12, modular battery subsystem 22b disposed in wing 16b and modular battery subsystem 22c disposed in wing 16a. Collectively, modular battery subsystems 22a, 22b, 22c may be referred to as modular battery system 22. Even though three modular battery subsystems have been depicted and described, it should be understood by those having ordinary skill in the art that a modular battery system of the present disclosure could have any number of modular battery subsystems or could be a unitary modular battery system. In addition, even though FIG. 1B depicts modular battery subsystems 22a, 22b, 22c in particular locations, it should be understood by those having ordinary skill in the art that a modular battery system of the present disclosure could have modular battery subsystems positioned in any suitable location including the fuselage, the wings, the empennage, the undercarriage, the ducts of the rotor assemblies or the like.

As discussed herein, modular battery system 22 includes a plurality of battery modules each including a plurality of battery cells. Preferably, the battery modules include a first side having positive and negative receptacles and a second side, that is opposite of the first side, having positive and negative plugs. The receptacles and plugs are configured such that adjacent battery modules having a side-by-side relationship are electrically coupled together via a positive plug and receptacle connection and a negative plug and receptacle connection and such that the battery modules are electrically coupled together in parallel forming a stack. In addition, an interconnection may be used to electrically couple stacks of battery modules together. The interconnection forms a positive plug and receptacle connection and a negative plug and receptacle connection with one of the battery modules in each stack such that the stacks of battery modules are electrically coupled together in parallel. This arrangement allows for the efficient swapping of battery modules within modular battery system 22 as well as for the ability to form different configurations within modular battery system 22 based upon the service of aircraft 10 and/or the mission being performed by aircraft 10. For example, if aircraft 10 is intended to provide local air taxi services operating within a predictable flight endurance range and payload range, modular battery system 22 of aircraft 10 may be configured with a lower number of battery modules such as 50 to 100 battery modules. As another example, if aircraft 10 is intended to provide regional air taxi services requiring greater flight endurance ranges and/or larger payloads, modular battery system 22 of aircraft 10 may be configured with a higher number of battery modules such as 100 to 200 battery modules.

Additionally, modular battery system 22 may incorporate battery modules having battery cell of different types based upon the service of aircraft 10 and/or the mission being performed by aircraft 10. For example, if aircraft 10 is intended to provide local air taxi services the ratio of battery modules having power cells to battery modules having energy cells may be higher than if aircraft 10 is intended to provide regional air taxi services. In this example, certain battery modules in modular battery system 22 would include an array of battery cells with a high power rating that are configured to supply a high instantaneous power output for use during high power demand maneuvers such as takeoff, hover, landing, certain mid-flight operations, emergency operations and the like, which may be referred to as the takeoff and landing power mode of aircraft 10. The power cells may also be configured for rapid charging following a discharge event. Examples of battery chemistry for use in the power cells include lithium manganese oxide, lithium nickel manganese oxide, lithium iron phosphate and lithium titanate oxide. Other battery modules in modular battery system 22 would include an array of battery cells with a high energy rating or high capacity that are configured to store a significant amount of energy and supply power over an extended period of time but at a lower maximum power level or maximum discharge rate such as during the cruise phase or forward flight portion of a mission, which may be referred to as the cruise power mode of aircraft 10. Examples of battery chemistry for use in the energy cells include lithium cobalt oxide, lithium nickel manganese oxide, lithium nickel manganese cobalt oxide, lithium nickel cobalt aluminum oxide, lithium sulfur and lithium metal. In addition, the power cells may have a different voltage in a fully charged state than do the energy cells.

Aircraft 10 has a fly-by-wire control system that includes a flight control system 40 that is preferably a redundant digital flight control system including multiple independent flight control computers. Flight control system 40 preferably includes non-transitory computer readable storage media including a set of computer instructions executable by one or more processors for controlling the operation of aircraft 10. Flight control system 40 may be implemented on one or more general-purpose computers, special purpose computers or other machines with memory and processing capability. Flight control system 40 may include one or more memory storage modules including random access memory, non-volatile memory, removable memory or other suitable memory entity. Flight control system 40 may be a microprocessor-based system operable to execute program code in the form of machine-executable instructions. Flight control system 40 may be connected to other computer systems via a suitable communication network that may include both wired and wireless connections.

Flight control system 40 communicates via a wired communications network within airframe 12 with modular battery system 22 and the electronics nodes of each rotor assembly 20. Flight control system 40 receives sensor data from and sends flight command information to rotor assemblies 20 such that each rotor assembly 20 may be individually and independently controlled and operated. For example, flight control system 40 is operable to individually and independently control the rotor speed and the collective pitch of each rotor assembly 20 as well as the angular position of each rotor assembly 20. Flight control system 40 may autonomously control some or all aspects of flight operations for aircraft 10. Flight control system 40 is also operable to communicate with remote systems, such as a ground station via a wireless communications protocol. The remote system may be operable to receive flight data from and provide commands to flight control system 40 to enable remote flight control over some or all aspects of flight operations for aircraft 10. In addition, aircraft 10 may be pilot operated such that a pilot interacts with a pilot interface that receives flight data from and provide commands to flight control system 40 to enable onboard pilot control over some or all aspects of flight operations for aircraft 10.

Aircraft 10 includes a landing gear 42 for ground operations. Landing gear 42 may include passively operated pneumatic landing struts or actively operated landing struts. In the illustrated embodiment, landing gear 42 includes a plurality of wheels that enable aircraft 10 to perform ground maneuvers. Landing gear 42 may include a passive brake system, an active brake system such as an electromechanical braking system and/or a manual brake system to facilitate parking as required during ground operations and/or passenger ingress and egress.

Figure 2A:
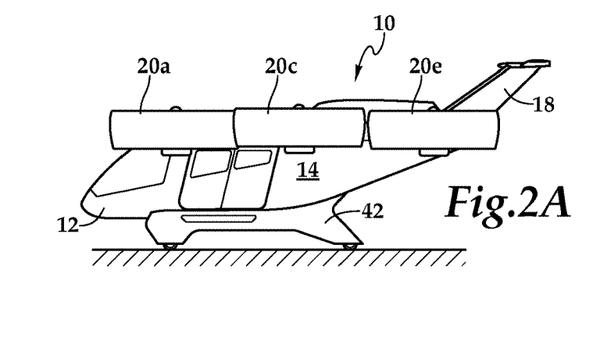
FIGS. 2A-2H are schematic illustrations of an eVTOL aircraft having a modular battery system engaging in a sequential flight operating scenario in accordance with embodiments of the present disclosure.

Referring additionally to FIGS. 2A-2H in the drawings, a sequential flight-operating scenario of aircraft 10 is depicted. As best seen in FIG. 2A, aircraft 10 is positioned on a surface prior to takeoff. When aircraft 10 is ready for a mission, flight control system 40 commences operations to provide flight control to aircraft 10 which may be onboard pilot flight control, remote flight control, autonomous flight control or a combination thereof. For example, it may be desirable to utilize onboard pilot flight control during certain maneuvers such as takeoff and landing but rely on autonomous flight control during hover, high speed forward flight and/or transitions between wing-borne lift and thrust-borne lift.

Figures 2B, 2C, 2D:
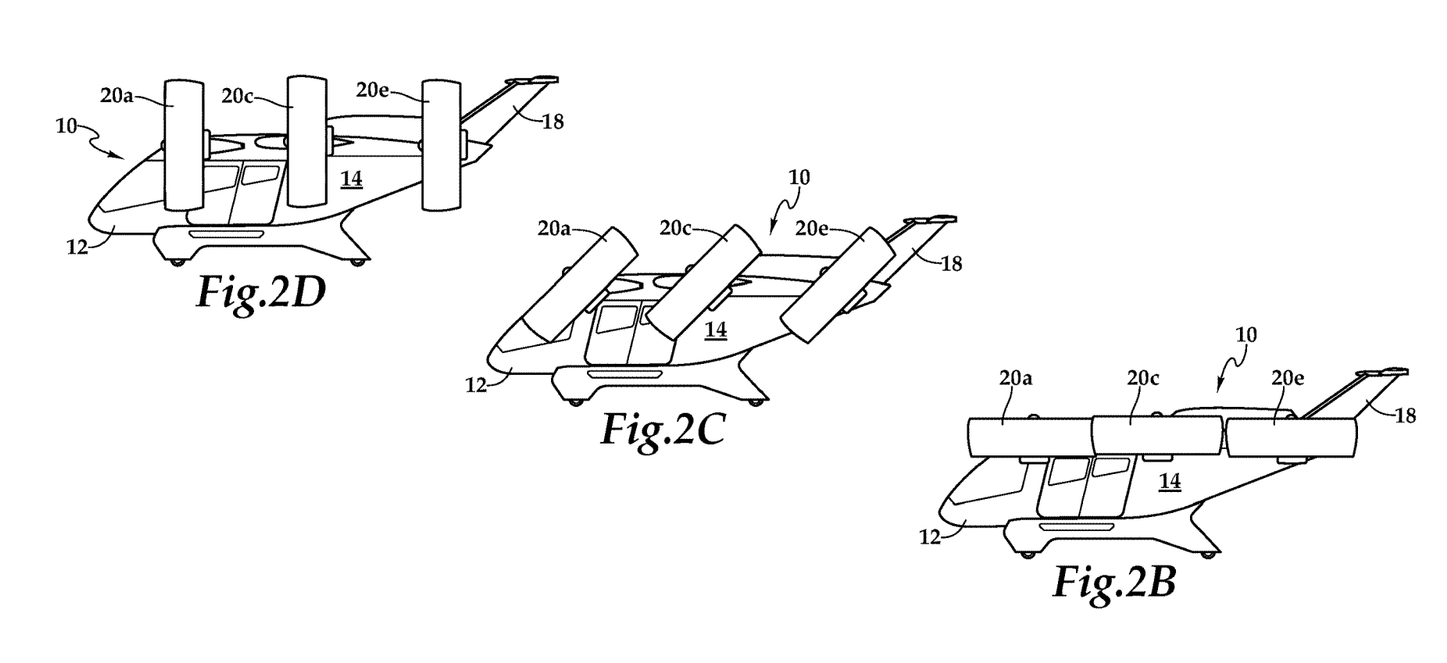
Figure 2E:
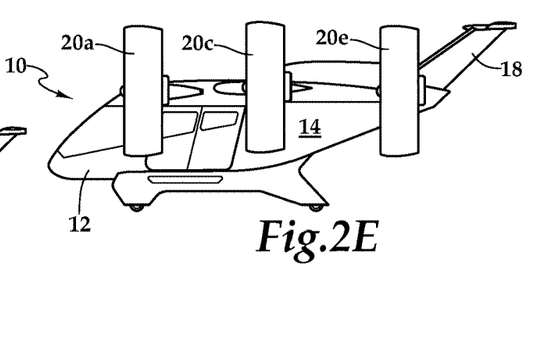

As best seen in FIG. 2B, aircraft 10 has performed a vertical takeoff and is engaged in thrust-borne lift. As illustrated, the rotors of each rotor assembly 20 are rotating in the same horizontal plane forming a two-dimensional distributed thrust array of six rotor assemblies. As the longitudinal axis and the lateral axis of aircraft 10 are both in the horizontal plane, aircraft 10 has a level flight attitude. During hover, flight control system 40 may utilize the individual variable speed control capability of rotor assemblies 20 to control flight dynamics to maintain hover stability and to provide pitch, roll and yaw authority for aircraft 10.

After vertical assent to the desired elevation, aircraft 10 may begin the transition from thrust-borne lift to wing-borne lift. As best seen from the progression of FIGS. 2B-2D, the angular positions of rotor assemblies 20 are changed by a pitch down rotation to transition aircraft 10 from the VTOL orientation toward the forward flight orientation. As seen in FIG. 2C, rotor assemblies 20 have been collectively inclined about forty-five degrees pitch down. In the conversion orientations of aircraft 10, a portion of the thrust generated by rotor assemblies 20 provides lift while a portion of the thrust generated by rotor assemblies 20 urges aircraft 10 to accelerate in the forward direction such that the forward airspeed of aircraft 10 increases allowing wings 16a, 16b to offload a portion and eventually all of the lift requirement from rotor assemblies 20. As best seen in FIG. 2D, rotor assemblies 20 have been collectively inclined about ninety degrees pitch down such that the rotors are rotating in vertical planes providing forward thrust for aircraft 10 with wings 16a, 16b providing lift. Even though the conversion from the VTOL orientation to the forward flight orientation of aircraft 10 has been described as progressing with collective pitch down rotation of rotor assemblies 20, in other implementation, all rotor assemblies 20 need not be operated at the same time or at the same rate.

As forward flight with wing-borne lift requires significantly less thrust than VTOL flight with thrust-borne lift, the operating speed of some or all of rotor assemblies 20 may be reduced particularly in embodiments having collective pitch control. In certain embodiments, some of rotor assemblies 20 of aircraft 10 could be shut down during forward flight.

Figure 2F:
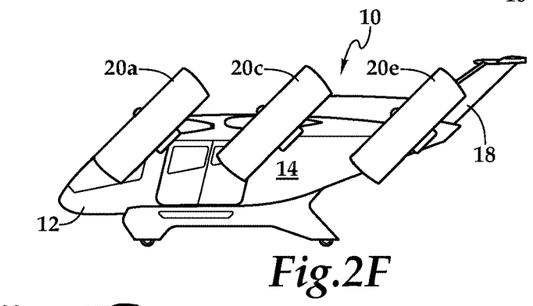
Figure 2G:
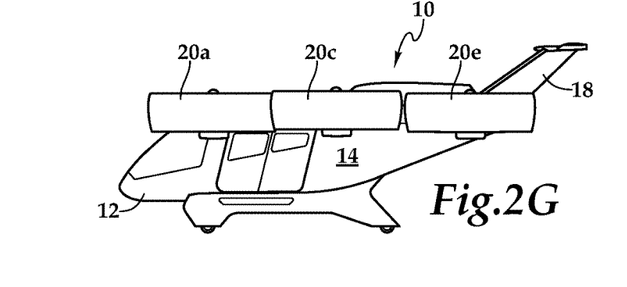
Figure 2H:
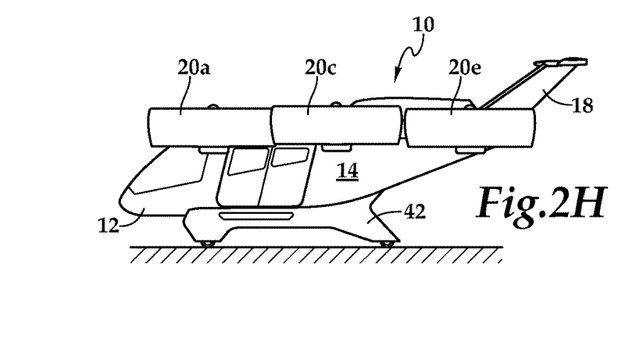

As aircraft 10 approaches its destination, aircraft 10 may begin its transition from wing-borne lift to thrust-borne lift. As best seen from the progression of FIGS. 2E-2G, the angular positions of rotor assemblies 20 are changed by a pitch up rotation to transition aircraft 10 from the forward flight orientation toward the VTOL orientation. As seen in FIG. 2F, rotor assemblies 20 have been collectively inclined about forty-five degrees pitch up. In the conversion orientations of aircraft 10, a portion of the thrust generated by rotor assemblies 20 begins to provide lift for aircraft 10 as the forward airspeed decreases and the lift producing capability of wings 16a, 16b decreases. As best seen in FIG. 2G, rotor assemblies 20 have been collectively inclined about ninety degrees pitch up such that the rotors are rotating in the horizontal plane providing thrust-borne lift for aircraft 10. Even though the conversion from the forward flight orientation to the VTOL orientation of aircraft 10 has been described as progressing with collective pitch up rotation of rotor assemblies 20, in other implementation, all rotor assemblies 20 need not be operated at the same time or at the same rate. Once aircraft 10 has completed the transition to the VTOL orientation, aircraft 10 may commence its vertical descent to a surface. As best seen in FIG. 2H, aircraft 10 has landing at the destination location.

Figure 3:
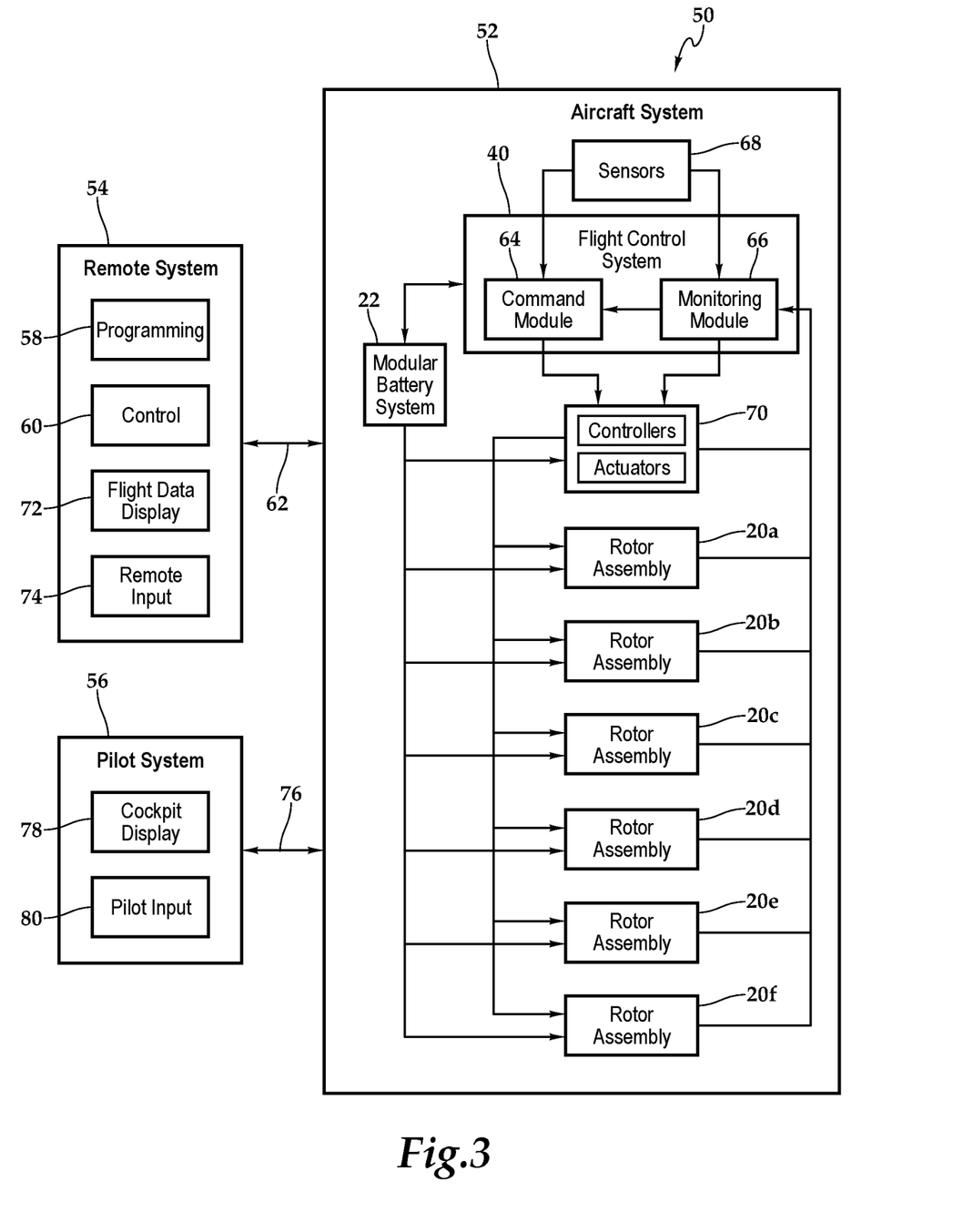
FIG. 3 is a block diagram of control systems for an eVTOL aircraft having a modular battery system in accordance with embodiments of the present disclosure.

Referring additionally to FIG. 3 in the drawings, a block diagram depicts a control system 50 operable for use with aircraft 10 of the present disclosure. In the illustrated embodiment, system 50 includes three primary computer based subsystems; namely, an aircraft system 52, a remote system 54 and a pilot system 56. In some implementations, remote system 54 includes a programming application 58 and a remote control application 60. Programming application 58 enables a user to provide a flight plan and/or other mission information to aircraft 10 such that flight control system 40 may engage in autonomous control over aircraft 10. For example, programming application 58 may communicate with flight control system 40 over a wired or wireless communication channel 62 to provide a flight plan including, for example, a starting point, a trail of waypoints and an ending point such that flight control system 40 may use waypoint navigation during the mission.

In the illustrated embodiment, flight control system 40 is a computer based system that includes a command module 64 and a monitoring module 66. It is to be understood by those skilled in the art that these and other modules executed by flight control system 40 may be implemented in a variety of forms including hardware, software, firmware, special purpose processors and combinations thereof. Flight control system 40 receives input from a variety of sources including internal sources such as modular battery system 22, sensors 68, controllers and actuators 70 and rotor assemblies 20a-20f and external sources such as remote system 54 as well as global positioning system satellites or other location positioning systems and the like. During the various operating modes of aircraft 10 including VTOL mode, forward flight mode and transitions therebetween, command module 64 provides commands to controllers and actuators 70. These commands enable independent operation of each rotor assembly 20a-20f including rotor speed, collective pitch and angular position. Flight control system 40 receives feedback from controllers and actuators 70 and rotor assemblies 20a-20f. This feedback is processed by monitoring module 66 that can supply correction data and other information to command module 64 and/or controllers and actuators 70. Sensors 68, such as vibration sensors, location sensors, attitude sensors, speed sensors, environmental sensors, fuel sensors, temperature sensors and the like also provide information to flight control system 40 to further enhance autonomous control and power allocation capabilities.

Some or all of the autonomous control capability of flight control system 40 can be augmented or supplanted by remote flight control from, for example, remote system 54. Remote system 54 may include one or computing systems that may be implemented on general-purpose computers, special purpose computers or other machines with memory and processing capability. Remote system 54 may be a microprocessor-based system operable to execute program code in the form of machine-executable instructions. In addition, remote system 54 may be connected to other computer systems via a proprietary encrypted network, a public encrypted network, the Internet or other suitable communication network that may include both wired and wireless connections. Remote system 54 communicates with flight control system 40 via communication link 62 that may include both wired and wireless connections.

While operating remote control application 60, remote system 54 is configured to display information relating to one or more aircraft of the present disclosure on one or more flight data display devices 72. Remote system 54 may also include audio output and input devices such as a microphone, speakers and/or an audio port allowing an operator to communicate with other operators, a base station and/or a pilot onboard aircraft 10. The display device 72 may also serve as a remote input device 74 if a touch screen display implementation is used, however, other remote input devices, such as a keyboard or joystick, may alternatively be used to allow an operator to provide control commands to an aircraft being operated responsive to remote control.

Some or all of the autonomous and/or remote flight control of aircraft 10 can be augmented or supplanted by onboard pilot flight control from a pilot interface system 56 that includes one or more computing systems that communicate with flight control system 40 via one or more wired communication channels 76. Pilot system 56 preferably includes one or more cockpit display devices 78 configured to display information to the pilot. Cockpit display device 78 may be configured in any suitable form including, for example, a display panel, a dashboard display, an augmented reality display or the like. Pilot system 56 may also include audio output and input devices such as a microphone, speakers and/or an audio port allowing an onboard pilot to communicate with, for example, air traffic control. Pilot system 56 also includes a plurality of user interface devices 80 to allow an onboard pilot to provide control commands to aircraft 10 including, for example, a control panel with switches or other inputs, mechanical control devices such as steering devices or sticks as well as other control devices.

Figure 4A:
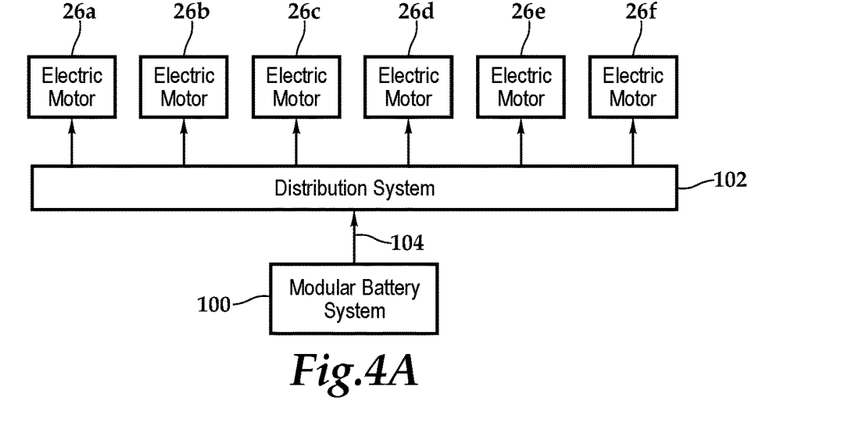
FIGS. 4A-4C are block diagrams depicting various electrical architectures for an eVTOL aircraft having a modular battery system in accordance with embodiments of the present disclosure.
Figure 4B:
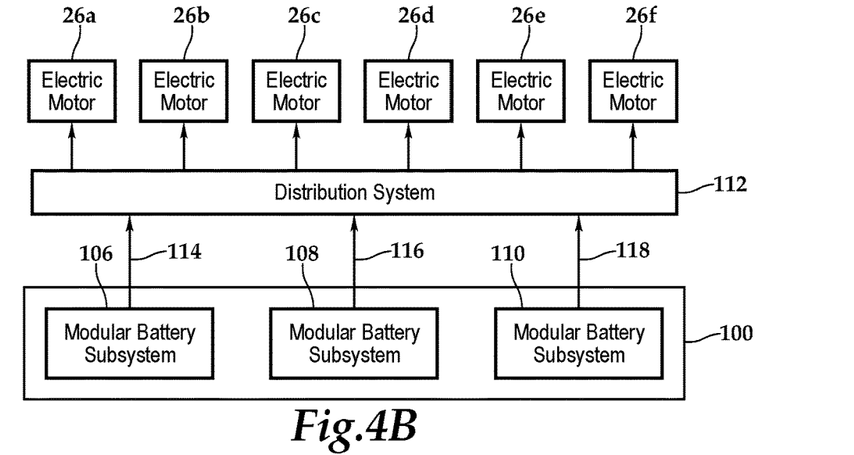
Figure 4C:
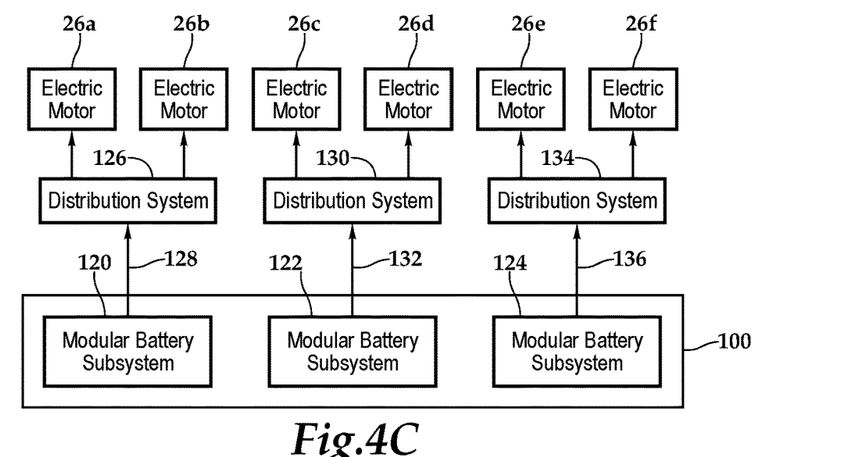

Referring now to FIGS. 4A-4C of the drawings, various electrical architectures for an aircraft having a modular battery system in accordance with embodiments of the present disclosure are illustrated. In FIG. 4A, a modular battery system 100 provides electric power to a distribution system 102, as indicated by arrow 104. Distribution system 102 delivers the electric power to the power consumers of aircraft 10 depicted as including electric motors 26a-26f of rotor assemblies 20, as indicated by the arrows therebetween. Distribution system 102 may include one or more electrical buses, electrical wiring, inverters and other electrical components known to those having ordinary skill in the art. In FIG. 4B, modular battery system 100 includes modular battery subsystems 106, 108, 110 each of which is providing electric power to a distribution system 112, as indicated by arrows 114, 116, 118. Distribution system 112 delivers the electric power to the power consumers of aircraft 10 depicted as including electric motors 26a-26f of rotor assemblies 20, as indicated by the arrows therebetween. The use of multiple modular battery subsystems to form the modular battery system of the present disclosure provides certain redundancy to the electrical architecture of aircraft 10. In FIG. 4C, modular battery system 100 includes modular battery subsystems 120, 122, 124. In the illustrated embodiment, modular battery subsystem 120 provides electric power to distribution system 126, as indicated by arrow 128, and distribution system 126 delivers the electric power to specific power consumers of aircraft 10 depicted as including electric motors 26a, 26b, as indicated by the arrows therebetween. Modular battery subsystem 122 provides electric power to distribution system 130, as indicated by arrow 132, and distribution system 130 delivers the electric power to specific power consumers of aircraft 10 depicted as including electric motors 26c, 26d, as indicated by the arrows therebetween. Modular battery subsystem 124 provides electric power to distribution system 134, as indicated by arrow 136, and distribution system 134 delivers the electric power to specific power consumers of aircraft 10 depicted as including electric motors 26e, 26f, as indicated by the arrows therebetween. The use of multiple modular battery subsystems and multiple distribution systems provides certain redundancy and isolation capability to the electrical architecture of aircraft 10.

Figure 5A:
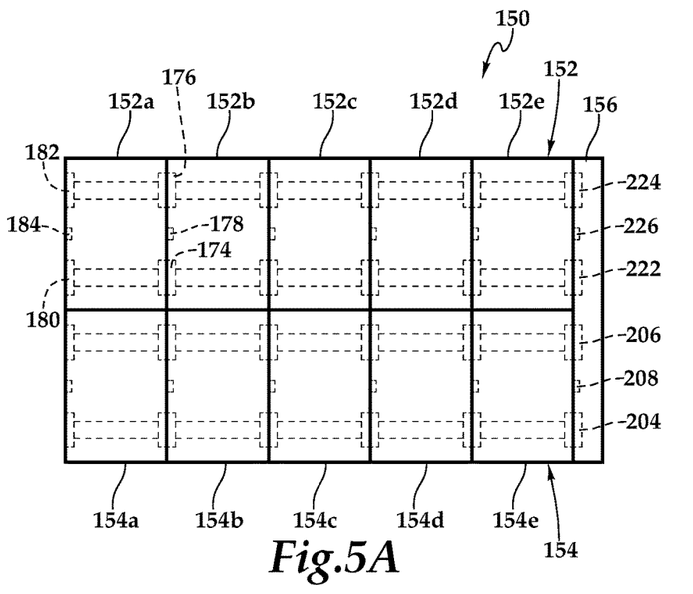
FIGS. 5A-5B depict assembled and exploded views of a modular battery system in accordance with embodiments of the present disclosure.
Figure 5B:
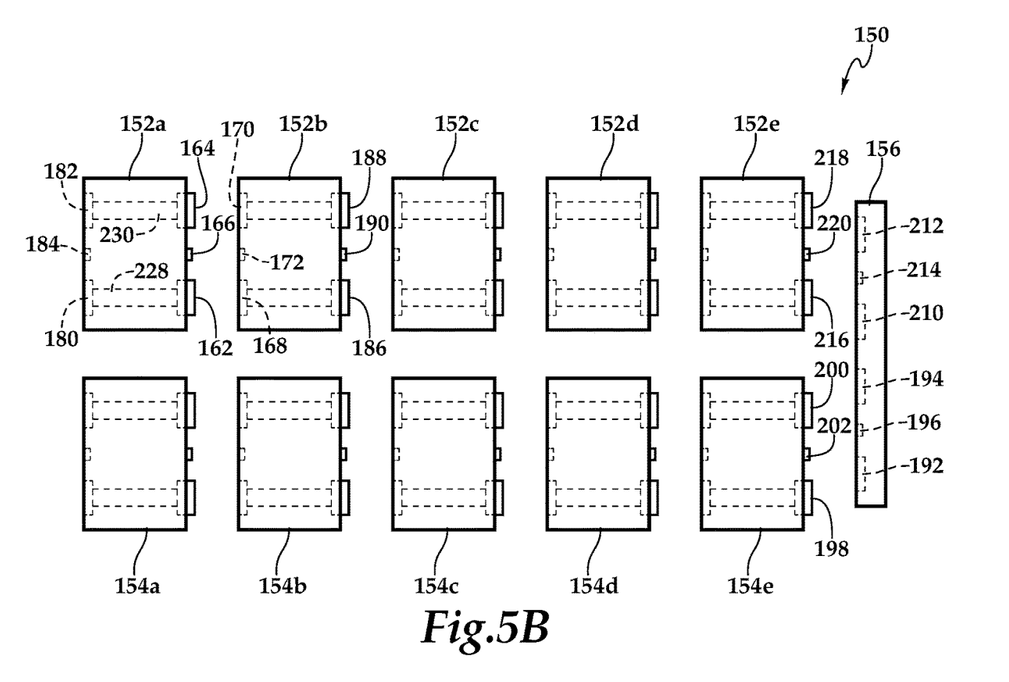

Referring now to FIGS. 5A-5B of the drawings, assembled and exploded views of a modular battery system in accordance with embodiments of the present disclosure are illustrated and generally designated 150. Modular battery system 150 includes an array of battery modules arranged in two stacks 152, 154. Stack 152 includes battery modules 152a, 152b, 152c, 152d, 152e that are electrically coupled together in parallel. Stack 154 includes battery modules 154a, 154b, 154c, 154d, 154e that are electrically coupled together in parallel. In the illustrated embodiment, stack 152 and stack 154 are electrically coupled together in parallel by an interconnection 156 to form modular battery system 150 which may be coupled to the power consumers of aircraft 10 by a suitable distribution system. Even though modular battery system 150 has been depicted and described as having a particular number of stacks, it should be understood by those having ordinary skill in the art that a modular battery system of the present disclosure could have any number of stacks both less than and greater than two. In addition, even though modular battery system 150 has been depicted and described as having a particular number of battery modules, it should be understood by those having ordinary skill in the art that a modular battery system of the present disclosure could have any number of battery modules both less than and greater than ten. Also, even though modular battery system 150 has been depicted and described as having the same number of battery modules in each stack, it should be understood by those having ordinary skill in the art that a modular battery system of the present disclosure could have different numbers of battery modules is different stacks.

Figure 6:
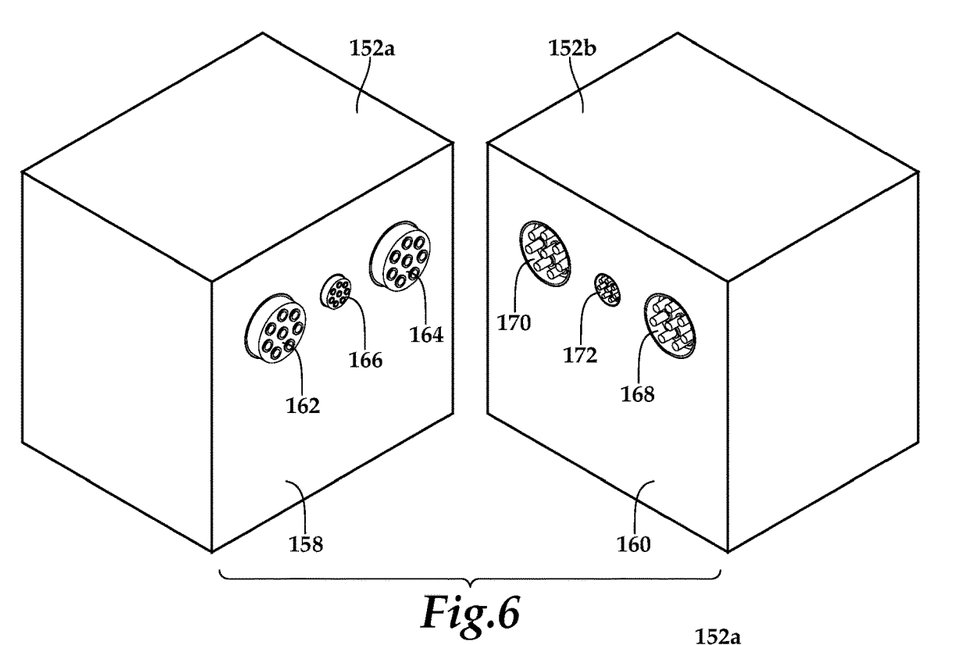
FIG. 6 is a schematic illustration of two battery modules for use in a modular battery system in accordance with embodiments of the present disclosure.

In the illustrated embodiment, adjacent battery modules, such as battery module 152a and battery module 152b, are electrically coupled together in a side-by-side relationship by forming plug and receptacle connections therebetween. Referring additionally to FIG. 6, a side surface 158 of battery module 152a and a side surface 160 of battery module 152b are revealed. Side 158 of battery module 152a includes three electrical receptacles; namely, a positive power receptacle 162, a negative power receptacle 164 and a signal receptacle 166. In the illustrated embodiment, receptacles 162, 164, 166 each extend outwardly from side 158. In other embodiments, the outer surface of the power and signal receptacles could be flush with or embedded within side 158 of battery module 152a. Side 160 of battery module 152b includes three electrical plugs; namely, a positive power plug 168, a negative power plug 170 and a signal plug 172. In the illustrated embodiment, plugs 168, 170, 172 are embedded within side 160 of battery module 152b. In other embodiments, the power and signal plugs could extend outwardly from side 160.

As illustrated, receptacles 162, 164, 166 are aligned with plugs 168, 170, 172 when battery module 152a and battery module 152b have a side-by-side relationship. Receptacles 162, 164, 166 are mated with plugs 168, 170, 172, respectively, by pushing battery modules 152a, 152b together. Specifically, receptacle 162 and plug 168 form a plug and receptacle connection 174, receptacle 164 and plug 170 form a plug and receptacle connection 176 and receptacle 166 and plug 172 form a plug and receptacle connection 178, as best seen in FIG. 5A. Receptacles 162, 164, 166 are unmated from plugs 168, 170, 172, respectively, by pulling battery modules 152a, 152b apart. As push and pull operations are used to mate and unmate adjacent battery modules, plug and receptacle connections 174, 176, 178 may be referred to as push-pull connections or blind mate connections. In some embodiments, when battery module 152a is pushed together with battery module 152b to form plug and receptacle connections 174, 176, 178, battery module 152a may be locked to battery module 152b, in which case, plug and receptacle connections 174, 176, 178 may be referred to as locking blind mate connections. In such cases, a tool may be used to unlock the plug and receptacle connections prior to pulling adjacent battery modules apart. In certain embodiments, plug and receptacle connections 174, 176, 178 may be formed with D38999 plug and receptacle connectors.

On the opposite side of battery module 152a from side surface 158, battery module 152a includes a positive power plug 180, a negative power plug 182 and a signal plug 184 that are positioned in the same manner as plugs 168, 170, 172 on side 160 of battery module 152b, as best seen in FIG. 5B. Likewise, on the opposite side of battery module 152b from side surface 160, battery module 152b includes a positive power receptacle 186, a negative power receptacle 188 and a signal receptacle 190 that are positioned in the same manner as receptacles 162, 164, 166 on side 158 of battery module 152a. In this manner, any number of battery modules of the present disclosure can be positioned in a side-by-side relationship and pushed together to form a stack having any desired length. In the illustrated embodiment, stack 152 and stack 154 are electrically coupled together by an interconnection 156. Specifically, interconnection 156 includes a positive power plug 192, a negative power plug 194 and a signal plug 196 that respectively mate with positive power receptacle 198, negative power receptacle 200 and signal receptacle 202 of battery module 154e, as best seen in FIG. 5B, to form plug and receptacle connections 204, 206, 208, as best seen in FIG. 5A. Interconnection 156 also includes a positive power plug 210, a negative power plug 212 and a signal plug 214 that respectively mate with positive power receptacle 216, negative power receptacle 218 and signal receptacle 220 of battery module 152e, as best seen in FIG. 5B, to form plug and receptacle connections 222, 224, 226, as best seen in FIG. 5A. In the illustrated embodiment, stack 152 and stack 154 are horizontal or lateral stacks. In other embodiments, the battery modules of the present disclosure could be positioned in vertical stacks and/or in combinations of horizontal stacks and vertical stacks. Depending upon the number and orientation of the stacks, more than one interconnection may be utilized.

The positive power receptacle of each battery module is electrically coupled to the positive power plug by a positive bus bar as representatively illustrated by positive bus bar 228 of battery module 152a in FIG. 5B. Likewise, the negative power receptacle of each battery module is electrically coupled to the negative power plug by a negative bus bar as representatively illustrated by negative bus bar 230 of battery module 152a in FIG. 5B. In this manner, any number of adjacent battery modules having a side-by-side relationship are electrically coupled together in parallel. In addition, any number of stacks of battery modules are electrically coupled together in parallel using one or more interconnections. Numerous benefits are achieved using the modular battery system of the present disclosure for providing propulsive power to a rotor system of an aircraft. For example, if a fault is discovered in a battery module, that battery module can be easily removed from the modular battery system and replaced with a properly functioning battery module. Similarly, discharged battery modules may simply be swapped with fully charged battery modules between flights. Also, as battery chemistry and/or battery technology improves, obsolete battery modules can be replaced with upgraded battery module without changing aircraft infrastructure.

Another benefit that is achieved using the modular battery system of the present disclosure is battery weight optimization. For example, based upon the service of aircraft 10 and/or the mission being performed by aircraft 10, the modular battery system of the present disclosure can be weight optimized to include a preferred number of battery modules including a preferred number of battery modules with power cells and a preferred number of battery modules with energy cells. As discussed herein, aircraft 10 may sometimes provide one type of service such as local air taxi services and at other times provide a different service such as regional air taxi services. In either case, the total number of battery modules in the modular battery system can be tailored to the flight requirements. In addition, the number of battery modules having energy cells and the number of battery modules having power cells can be tailored to the flight requirements. For example, the number battery modules with energy cells could be selected to provide the required power for all the electrical requirements of aircraft 10 in the cruise power mode based upon the efficiencies of the components and other factors that are well known to those having ordinary skill in the art. Likewise, the number battery modules with power cells could be selected to provide the required boost in power for the instantaneous peak power requirements in the takeoff and landing power mode based upon the efficiencies of the components and other factors that are well known to those having ordinary skill in the art. Alternatively, the number battery modules with power cells could be selected to provide the total instantaneous peak power requirements for the takeoff and landing power mode.

Figure 7:
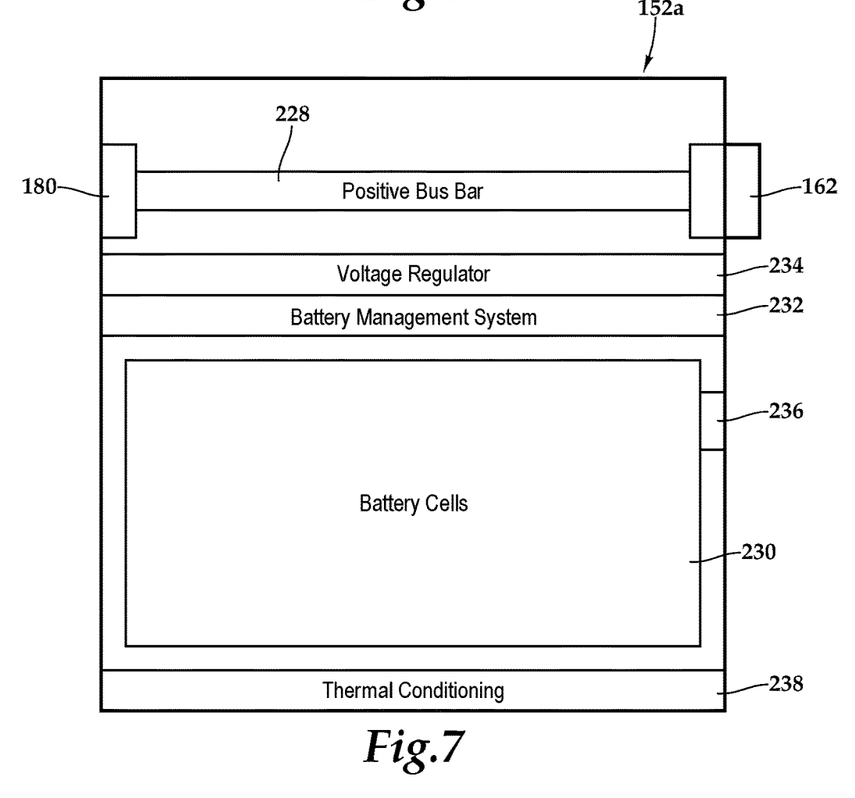
FIG. 7 is a schematic illustration of a battery module for use in a modular battery system in accordance with embodiments of the present disclosure.

Referring additionally to FIG. 7 of the drawings, battery module 152a will be discussed in greater detail. Battery module 152a is substantially similar to the other battery modules therefore, for sake of efficiency, certain features will be disclosed only with regard to battery module 152a. One having ordinary skill in the art, however, will fully appreciate an understanding of each of battery modules based on the disclosure herein of battery module 152a. In FIG. 7, component parts of battery module 152a are illustrated as being contained in a single housing which tends to provide a compact package and be weight efficient. As illustrated, battery module 152a includes a plurality of battery cells 230 that are arranged in series such that a desired cell voltage is achieved. Alternatively or additionally, battery module 152a may contain a plurality of battery cell groups that are in parallel with each other, wherein each of the battery cell groups includes a plurality of battery cells arranged in series such that a desired cell voltage is achieved. Depending upon the specific implementation, battery module 152a may include tens or hundreds of battery cells 230. Battery module 152a includes a battery management system 232 that provides, for example, short circuit protection, over-charge protection, over-discharge protection and over-current protection to battery cells 230. In addition, power battery management system 232 calculates the state of charge of battery cells 230 and monitors the health and safety of battery cells 230.

Battery module 152a includes a controller depicted as voltage regulator 234 such as a DC-to-DC converter used to upconvert the voltage of battery cells 230 to the desired bus voltage and to downconvert the bus voltage when battery cells 230 are being recharged. For example, the voltage to battery cells 230 when fully charged may be between 550 volts and 800 volts or other suitable cell voltage while the bus voltage may be between 800 volts and 1500 volts or other suitable bus voltage. As previously discussed, battery module 152a includes positive power receptacle 162 that is electrically coupled to positive power plug 180 via positive bus bar 228. In the illustrated embodiment, battery module 152a includes a vent system 236 that is configured to release gas produced by battery cells 230, such as gas generated as a result of a thermal runaway. In addition, battery module 152a includes a thermal conditioning system 238, such as a liquid cooling system, that is configured to thermally isolate battery module 152a from the other battery modules in the modular battery system of the present disclosure.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A modular battery system for providing propulsive power to a rotor system of an aircraft, the modular battery system comprising:

an array of battery modules arranged in at least one stack, each battery module including a plurality of battery cells, a battery management system configured to provide protections for the battery cells, a first side having positive and negative receptacles and a second side, that is opposite of the first side, having positive and negative plugs, the receptacles and plugs configured such that adjacent battery modules having a side-by-side relationship are electrically coupled together via a positive plug and receptacle connection and a negative plug and receptacle connection and such that the battery modules are electrically coupled together in parallel; and an interconnection electrically coupling each of the stacks of battery modules together, the interconnection forming a positive plug and receptacle connection and a negative plug and receptacle connection with one of the battery modules in each stack such that the stacks of battery modules are electrically coupled together in parallel.

2. The modular battery system as recited in claim 1 wherein each of the battery modules further comprises a vent configured to release gas produced by the battery cells.

3. The modular battery system as recited in claim 1 wherein each of the battery modules further comprises a voltage regulator configured to convert voltage between a battery cell voltage and a bus voltage.

4. The modular battery system as recited in claim 1 wherein each of the battery modules further comprises a DC-to-DC converter configured to convert voltage between a battery cell voltage and a bus voltage.

5. The modular battery system as recited in claim 1 wherein each of the battery modules further comprises a positive bus bar and a negative bus bar coupled to the battery cells, the positive bus bar operably associated with the positive receptacle and the positive plug, the negative bus bar operably associated with the negative receptacle and the negative plug.

6. The modular battery system as recited in claim 1 wherein each of the battery modules further comprises a thermal conditioning system configured to thermally isolate the battery module from the other battery modules.

7. The modular battery system as recited in claim 1 wherein a first plurality of battery modules in the array of battery modules includes battery cells of a first type and a second plurality of battery modules in the array of battery modules includes battery cells of a second type that are different from the first type.

8. The modular battery system as recited in claim 7 wherein the battery cells of the first type are power cells and the battery cells of the second type are energy cells.

9. The modular battery system as recited in claim 7 wherein the battery cells of the first type have a voltage in a fully charged state that is different than a voltage in a fully charged state of the battery cells of the second type.

10. The modular battery system as recited in claim 7 wherein the battery cells of the first type have a maximum discharge rate that is different than a maximum discharge rate of the battery cells of the second type.

11. The modular battery system as recited in claim 7 wherein the battery cells of the first type have a chemistry that is different than a chemistry of the battery cells of the second type.

12. The modular battery system as recited in claim 1 wherein the plug and receptacle connections are push-pull connections.

13. The modular battery system as recited in claim 1 wherein the plug and receptacle connections are blind mate connections.

14. The modular battery system as recited in claim 1 wherein the plug and receptacle connections are locking blind mate connections.

15. An electrical system configured to provide propulsive power to a rotor system of an aircraft, the electrical system comprising:

at least one electric motor configured to drive the rotor system;

a modular battery system including:

an array of battery modules arranged in at least one stack, each battery module including a plurality of battery cells, a battery management system configured to provide protections for the battery cells, a first side having positive and negative receptacles and a second side, that is opposite of the first side, having positive and negative plugs, the receptacles and plugs configured such that adjacent battery modules having a side-by-side relationship are electrically coupled together via a positive plug and receptacle connection and a negative plug and receptacle connection and such that the battery modules are electrically coupled together in parallel; and an interconnection electrically coupling each of the stacks of battery modules together, the interconnection forming a positive plug and receptacle connection and a negative plug and receptacle connection with one of the battery modules in each stack such that the stacks of battery modules are electrically coupled together in parallel; and a distribution system electrically coupling the modular battery system to the at least one electric motor.

16. An aircraft comprising:

a rotor system having at least one electric motor;

a modular battery system including:

an array of battery modules arranged in at least one stack, each battery module including a plurality of battery cells, a battery management system configured to provide protections for the battery cells, a first side having positive and negative receptacles and a second side, that is opposite of the first side, having positive and negative plugs, the receptacles and plugs configured such that adjacent battery modules having a side-by-side relationship are electrically coupled together via a positive plug and receptacle connection and a negative plug and receptacle connection and such that the battery modules are electrically coupled together in parallel; and an interconnection electrically coupling each of the stacks of battery modules together, the interconnection forming a positive plug and receptacle connection and a negative plug and receptacle connection with one of the battery modules in each stack such that the stacks of battery modules are electrically coupled together in parallel; and a distribution system electrically coupling the modular battery system to the at least one electric motor.

17. The aircraft as recited in claim 16 wherein the rotor system further comprises a plurality of rotor assemblies.

18. The aircraft as recited in claim 16 wherein the aircraft is an eVTOL aircraft.

19. The aircraft as recited in claim 18 wherein the eVTOL aircraft is an air taxi configured for autonomous flight.

* * * * *